(No Model.)

F. B. TORREY.
JOURNAL AND BEARING.

No. 335,047. Patented Jan. 26, 1886.

Attest

Inventor
Francis B. Torrey

UNITED STATES PATENT OFFICE.

FRANCIS B. TORREY, OF BATH, MAINE.

JOURNAL AND BEARING.

SPECIFICATION forming part of Letters Patent No. 335,047, dated January 26, 1886.

Application filed December 16, 1885. Serial No. 185,855. (No model.)

*To all whom it may concern:*

Be it known that I, FRANCIS B. TORREY, of Bath, in the county of Sagadahoc and State of Maine, have invented a new and useful Improvement in Journals and Bearings; and I do hereby declare that the following is a full, clear, and exact description of the same.

My invention relates to journals and bearings of that class in which a lubricating or non-heating material is combined with the metal or material which forms the body of the journal or bearing or the lining thereof.

Heretofore various materials adapted to form lubricating or non-heating surfaces have been combined with the metal linings or metal substances of journal-boxes, axle-boxes, and the like. These substances have ordinarily been used as filling in grooves or holes cut or formed in the bearing-surface. The material known as "metalline" has also been combined with sheet metal by perforating the sheet metal and pressing the metalline into the holes. Such sheets have also been described as subjected to rolling, to depress the metal at the surface partially over the holes in order to retain the metalline in place. Such sheets are designed to be cut up to form the linings.

The object of my invention is to secure the lubricating or non-heating material in the middle of the journal or bearing, so that it shall not be liable to fall out when in use.

My object, further, is to compress the material in its place in the formation of the bearing-surface; and, third, to form the bearing-surface of the materials described in an economical manner.

My invention consists of the special construction of the bearing-surface and in the mode of applying it to a sheave or pulley.

Figure 1:
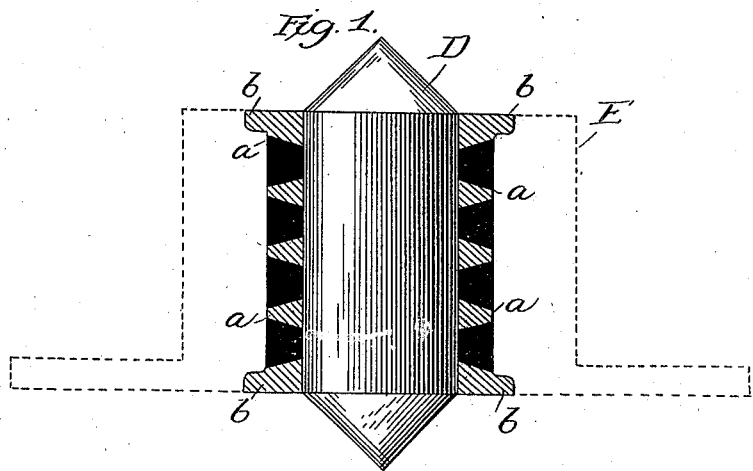
Figure 2:
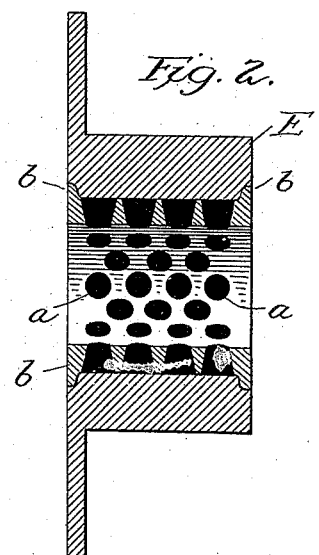
Figure 3:
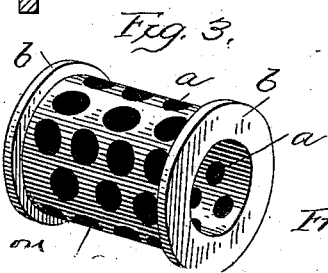

In the accompanying drawings, Figure 1 shows the improved bearing separate from its pulley. Fig. 2 shows a central axial section of a pulley or bushing provided with my improved bearing. Fig. 3 is a perspective view of the sleeve.

In the drawings, Figure 1 represents a sleeve, which may be formed of brass or any suitable material, the inner surface of which forms the bearing-surface for the pin or axle upon which the wheel or pulley is to turn. The sleeve is formed with holes $a$ $a$, which flare from the inside outward. I preferably form flanges $b$ $b$ at the end of the sleeve, the outer faces of which will coincide with the faces of the bushing or the wheel or sheave. These holes are filled with any suitable material—such as plumbago, asbestus, or any of their compounds or mixtures. The sleeve is then placed in a mold, and the sheave or wheel or bushing E therefor is cast about it. The shrinking of the metal compresses the material in the holes and secures it firmly in place.

In order to center the sleeve, I use a pin, D, (shown in Fig. 1,) fitted to the bore of the sleeve and tapered to point at each end. By means of this the sleeve may be set true with the form of the wheel in the mold.

I have shown the sleeve formed with round holes, tapering or flaring; but I may form elongated holes or slots with the same flare. This flaring form is best for the compression of the material and for holding it in place under wear; but I may use cylindrical holes, or holes or slots not flared from the inside outwardly. The pin in this case forms the surface against which the filling is pressed by the shrinkage of the metal.

I do not, in fact, limit myself in any respect as to the form of the holes in connection with the compression applied by this shrinkage about the sleeve, the method of operation being the same whatever the form of the holes; nor are the flanges $b$ $b$ necessary, it being requisite only that the metal cast about the sleeve shall bear upon the filling in the holes and compress it against the sides of the holes or against the surface of the pin in the sleeve.

The same construction of sleeve may be applied to a journal by reversing the flare of the holes in the sleeve and shrinking it on the journal.

I claim as my invention—

1. The method herein described of forming a bearing, consisting in casting the metal upon a sleeve which has been formed with holes and provided with suitable filling, substantially as described.

2. A bearing for wheels, sheaves, or pulleys, consisting of a sleeve formed with holes, which are filled with suitable lubricating or non-heating material, combined with a wheel, pulley, or sheave or bushing cast thereon, substantially as described.

3. A bearing for wheels, sheaves, or pulleys, consisting of a sleeve formed with holes flaring from the inside outwardly and filled with lubricating or non-heating material, combined with a bushing, wheel, or pulley or sheave cast thereon, substantially as described.

4. The sleeve described, having flared holes and lubricating or non-heating filling adapted to be compressed by the shrinking of the metal thereon, substantially as described.

In testimony whereof I have signed my name to this specification in the presence of two subscribing witnesses.

FRANCIS B. TORREY.

Witnesses:
  JOHN B. THOMPSON,
  WALTER DONALDSON.